United States Patent [19]

Ohlsson

[11] Patent Number: 4,647,079
[45] Date of Patent: Mar. 3, 1987

[54] QUICK-COUPLING ASSEMBLY

[76] Inventor: Weimar Ohlsson, Solrosvägen 3, Surte, Sweden, 445 00

[21] Appl. No.: 839,809

[22] Filed: Mar. 12, 1986

Related U.S. Application Data

[63] Continuation of Ser. No. 549,495, Nov. 8, 1983, abandoned.

[51] Int. Cl.[4] ............................................. F16L 37/08
[52] U.S. Cl. ..................................... 285/276; 285/281; 285/308; 285/315
[58] Field of Search ............... 285/276, 277, 307, 308, 285/281, 319, 314, 315; 251/149.1, 149.8

[56] References Cited

U.S. PATENT DOCUMENTS

| 1,904,061 | 4/1933 | Larson | 285/319 |
| 3,887,222 | 6/1975 | Hammond | 285/307 |
| 3,908,925 | 9/1975 | Rinkleib et al. | 285/319 |
| 4,208,034 | 6/1980 | Ohlsson | 251/149.1 |

FOREIGN PATENT DOCUMENTS

| 417249 | 1/1967 | Switzerland | 285/276 |
| 1191236 | 5/1970 | United Kingdom | 285/281 |

Primary Examiner—Cornelius J. Husar
Assistant Examiner—Eric K. Nicholson
Attorney, Agent, or Firm—Holman & Stern

[57] ABSTRACT

A quick-coupling assembly for fluid conduits and of the kind comprising a first sleeve-shaped member, which at one end is provided with a number of resilient tongues provided with at least one projection intended to be locked behind at least one shoulder or the like in a second sleeve-shaped member for being connected to this and a ring being actually displaceable in the second member towards and away from the shoulder and being designed to cooperate with the tongues for compressing these so that they can be moved past the shoulder. The object of the invention is to provide a quick-coupling which despite high pressures (e.g. 350 bar) is easily rotatable so that a pressure hose connected to the coupling really can rotate, which is especially important at many hydraulic arrangement where relative movements occur between different structural parts connected to each other by pressure hoses. This object has been solved by the fact that the shoulder (5) comprises a ring (10) which is rotatably but undisplaceably arranged with respect to the second sleeve-shaped member (4).

2 Claims, 1 Drawing Figure

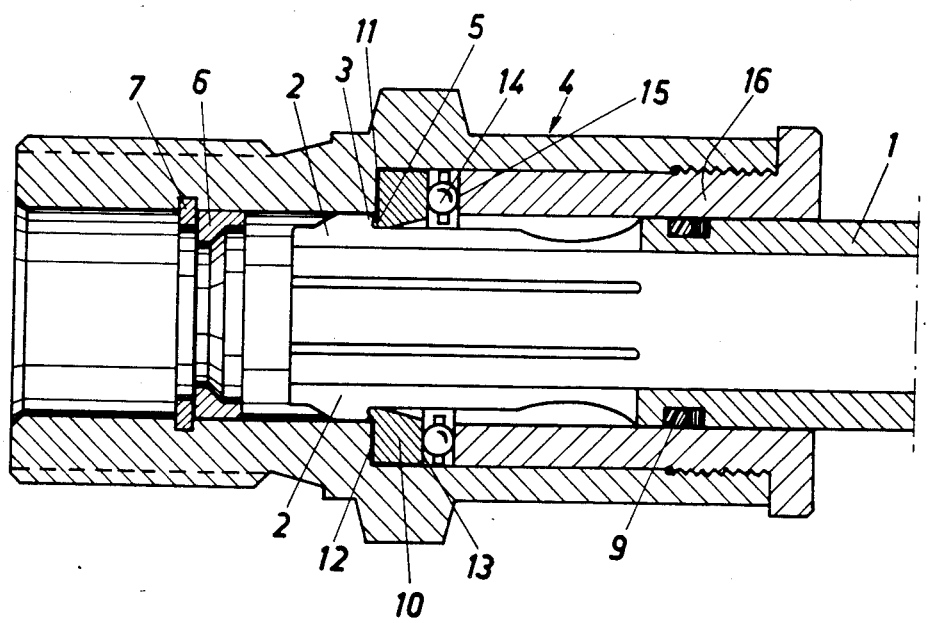

QUICK-COUPLING ASSEMBLY

This is a continuation of application Ser. No. 549,495, filed Nov. 8, 83, abandoned.

The present invention refers to a quick coupling assembly for fluid conduits and of the kind comprising a first sleeve-shaped member, which at one end is provided with a number of resilient tongues provided with at least one projection intended to be locked behind at least one shoulder or the like in a second sleeve-shaped member for being connected to this, a ring being axially displaceable in a second member towards and away from the shoulder and being designed to cooperate with the tongues for compressing these so that they can be moved past the shoulder.

BACKGROUND OF THE INVENTION

Quick-coupling assemblies of the above mentioned kind are previously known through U.S. Pat. No. 4,208,034 to Ohlsson. These couplings are especially adapted as hydraulic couplings for very high pressures and an advantage is that they can be connected and disengaged with a very simple manipulation without any tools. By the special design the couplings can be arranged in close groups, which means that the hydraulic blocks can be made considerably more compact than previously. A drawback with these couplings is however, especially if they are used for very high pressures, that they cannot freely rotate about its axis, i.e. the axis of the coupling, and therefore, in such cases where rotation can occur, the coupling must be provided with special rotation means. This however, complicates the construction and also provides a possible untightness at the same time as it raises the price of the coupling.

SUMMARY AND ADVANTAGES OF THE INVENTION

The object of the present invention is to provide a quick coupling, which despite high pressures (e.g. 350 bar) is easily rotatable so that the pressure hose connected to the coupling freely can rotate, which is especially important at many hydraulic arrangements where relative movements can occur between different structural parts connected to each other by pressure hoses. This object has been solved by the fact that the shoulder comprises a ring rotatably but axially undisplaceably arranged with respect to the second sleeve-shaped member.

BRIEF DESCRIPTION OF THE DRAWING

The invention will now be more closely described with reference to the accompanying drawing which shows a longitudinal section through a quick-coupling according to the invention with the coupling members coupled together.

DESCRIPTION OF EMBODIMENT

The quick coupling assembly comprises a first sleeve-shaped member 1, for example intended to be connected to a hose (not shown) or the like. The first member 1 is at its free end slit open, so that for example four resilient tongues 2 are formed. Each tongue 2 has a peripheral, hook-shaped projection 3. A second sleeve-shaped member 4, which can be designed to be connected to a hydraulic component or the like is at its inside provided with a circumferential shoulder 5, behind which the projections 3 of the tongues 2 are intended to engage for connection of the first and second members 1 and 4 respectively.

The second member 4 is at some distance from the shoulder 5 provided with a withdrawal ring 6, which is axially displaceable between the shoulder 5 and a locking ring 7. The ring 6 is designed with a bevelled portion intended to cooperate with the tongues 2 for compressing these, so that they can be moved past the shoulder 5.

The tongues are at their outside designed with a conicity decreasing from their projection 3 towards the free end, in order to admit cooperation with the shoulder 5 and the ring 6. The tongues 2 show less thickness of material than the non-slit part of the first member, which with its outer side partly is intended to make contact with the inside of the second member 4. A sealing means 9 is provided within said portion, intended to make a sealing contact with the inside of the second member 4.

The shoulder 5 comprises a ring 10, rotatably but axially undisplaceably arranged with respect to the sleeve 4 and which with its end shoulder 11 makes contact with a step 12 in the sleeve-shaped member 4. The end surface 13 of the ring 10 remote from the shoulder cooperates with a friction reducing member 14, which according to the embodiment shown comprises a thrust bearing. The thrust bearing makes contact with the end surface 15 of a barrel nut 16, which is screwed into the second member 4.

In the position shown where the members 1 and 4 are coupled together the members can thus rotate with respect to each other about the common axis of the coupling member.

I claim:

1. A quick-coupling assembly for fluid conduits and of the kind comprising a first sleeve-shaped member which at one end is provided with a number of resilient tongues provided with at least one projection intended to be locked behind at least one shoulder in a second sleeve-shaped member for connecting the sleeve-shaped members together, the shoulder having a chamfered inner surface for compressing the tongues when the first member is inserted in the second member, a first ring being axially displaceable in the second member towards and away from the shoulder and being designed to cooperate with the tongues for compressing the tongues so that the tongues can be moved past the shoulder for disengaging the members, characterized in that the shoulder comprises a second ring which is rotatable but axially undisplaceably arranged with respect to the second sleeve-shaped member such that an axially facing end surface of the second ring remote from the shoulder cooperates with a friction-reducing means arranged to bear against an abutment surface in the second member and such that an opposite end surface of the ring engages against an internally projecting step formed on an inner surface of the second member, wherein the abutment surface comprises an end surface of a barrel nut thread into the second member, the barrel nut having an internal guide and bearing surface for the first sleeve-shaped member, the assembly facilitating rotation of the first sleeve-shaped member within the second sleeve-shaped member.

2. An assembly according to claim 1, characterized in that the friction-reducing means is a thrust bearing.

* * * * *